US008805000B2

(12) United States Patent
Derby et al.

(10) Patent No.: US 8,805,000 B2
(45) Date of Patent: Aug. 12, 2014

(54) MOBILE ENERGY AUDIT SYSTEM AND METHOD

(75) Inventors: Paul Derby, Lubbock, TX (US); Hari Thiruvengada, Plymouth, MN (US); Pallavi Dharwada, Minneapolis, MN (US); Wendy Foslien, Woodbury, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/591,386

(22) Filed: Aug. 22, 2012

(65) Prior Publication Data

US 2013/0050511 A1 Feb. 28, 2013

Related U.S. Application Data

(60) Provisional application No. 61/526,522, filed on Aug. 23, 2011.

(51) Int. Cl.
*G06K 9/00* (2006.01)

(52) U.S. Cl.
USPC ............ 382/100; 382/181; 382/152; 382/209

(58) Field of Classification Search
USPC ............ 382/181; 700/291
See application file for complete search history.

(56) References Cited

U.S. PATENT DOCUMENTS 5,171,976 A * 12/1992 Bone, Jr. .................. 235/375
7,508,319 B2 * 3/2009 Kagan .................. 340/870.02
8,131,118 B1 * 3/2012 Jing et al. .................. 382/305
8,170,886 B2 * 5/2012 Luff .................. 705/1.1
8,375,118 B2 * 2/2013 Hao et al. .................. 709/223
8,396,602 B2 * 3/2013 Imes et al. .................. 700/276
8,577,505 B2 * 11/2013 Foslien et al. .................. 700/275
2005/0246295 A1 * 11/2005 Cameron .................. 705/412
2006/0110029 A1 * 5/2006 Kazui et al. .................. 382/159
2006/0165305 A1 * 7/2006 Hasebe et al. .................. 382/243
2008/0075378 A1 * 3/2008 Kim et al. .................. 382/252
2008/0093460 A1 * 4/2008 Frantz et al. .................. 235/462.46
2009/0125825 A1 * 5/2009 Rye et al. .................. 715/764
2009/0179770 A1 * 7/2009 Kagan .................. 340/870.02
2010/0082499 A1 * 4/2010 Luff .................. 705/317
2010/0250588 A1 * 9/2010 Kita .................. 707/769
2010/0260373 A1 * 10/2010 Neven et al. .................. 382/100
2010/0283735 A1 * 11/2010 Kim et al. .................. 345/168
2011/0027803 A1 * 2/2011 Moussavi et al. .................. 435/7.9

(Continued)

FOREIGN PATENT DOCUMENTS

JP 2006098361 A * 4/2006

OTHER PUBLICATIONS

Dale Baker, QR Code and Are your Home windows Energy efficent Flyer, created by Dale Baker Jun. 30, 2011, NPL.*

(Continued)

*Primary Examiner* — Chan Park
*Assistant Examiner* — Iman K Kholdebarin
(74) *Attorney, Agent, or Firm* — Schwegman, Lundberg & Woessner, P.A.

(57) ABSTRACT

A system and method includes obtaining an address of a structure, obtaining picture of objects in the structure with a networked mobile device, deriving identification information from the pictures, using the identification information to obtain energy usage information from databases, and generating an energy audit based on the objects and energy usage information.

17 Claims, 6 Drawing Sheets

(56) References Cited

U.S. PATENT DOCUMENTS

| | | | | |
|---|---|---|---|---|
| 2011/0029341 | A1* | 2/2011 | Muse et al. | 705/7 |
| 2011/0051823 | A1* | 3/2011 | Imes et al. | 375/259 |
| 2011/0131041 | A1* | 6/2011 | Cortez et al. | 704/235 |
| 2011/0145093 | A1* | 6/2011 | Paradise et al. | 705/26.41 |
| 2011/0176733 | A1* | 7/2011 | Ch Ien | 382/195 |
| 2011/0251807 | A1* | 10/2011 | Rada et al. | 702/61 |
| 2012/0078417 | A1* | 3/2012 | Connell et al. | 700/248 |
| 2012/0101649 | A1* | 4/2012 | Rothschild | 700/291 |
| 2013/0045753 | A1* | 2/2013 | Obermeyer et al. | 455/456.1 |
| 2013/0050511 | A1* | 2/2013 | Derby et al. | 348/207.1 |
| 2013/0055132 | A1* | 2/2013 | Foslien | 715/771 |
| 2013/0066479 | A1* | 3/2013 | Shetty et al. | 700/295 |
| 2013/0113822 | A1* | 5/2013 | Putrevu et al. | 345/619 |
| 2013/0183952 | A1* | 7/2013 | Davis et al. | 455/418 |
| 2013/0226546 | A1* | 8/2013 | Suyeyasu et al. | 703/6 |
| 2014/0019319 | A1* | 1/2014 | Derby et al. | 705/30 |
| 2014/0074435 | A1* | 3/2014 | Cohn et al. | 702/184 |
| 2014/0078398 | A1* | 3/2014 | Shenoy et al. | 348/515 |

OTHER PUBLICATIONS

Dale Baker, QR code and are you home windows energy efficient, NPL website, Jun. 30, 2011.*

“Great Britain Application Serial No. 1215009.0, Office Action mailed Nov. 28, 2012”, 8 pgs.

Danko, P., “Energy Audit: There’s an App for That”, Earthtechling., [online]. [Retrieved on Nov. 22, 2012]. Retrieved from the Internet: <URL: http://www.earthtechling.corn/2011/03/energy-audit-theres-an-app-for-that/>, (Mar. 5, 2011), 4 pgs.

* cited by examiner

MOBILE ENERGY AUDIT SYSTEM AND METHOD

RELATED APPLICATION

This application claims priority to U.S. Provisional Application Ser. No. 61/526,522 (entitled Mobile Energy Audit System and Method, filed Aug. 23, 2011) which is incorporated herein by reference.

BACKGROUND

Current energy auditing services provided by service providers (e.g., Honeywell Utility Solutions) require an expert energy auditor. Other consumer applications (e.g., EcoInsight, Microsoft Hohm, Energy Audit mobile applications) require the user to manually input many pieces of information about their home. This information includes, but is not limited to, the specifications about the house structure, the home equipment (e.g., HVAC, hot water heater), doors, windows, appliances, lighting, and pools. If the homeowners do not know all of this information or lack the motivation to manually input it, then it is difficult for homeowners to perform an energy audit on their own.

Trained auditing professionals spend approximately 2-3 days per commercial site or 2 hours per residential site to perform an energy audit. This time is spent collecting data manually, using PC-based software or checklists, which makes the process inefficient and predisposed to errors. In addition, many of the energy characteristics are unknown and oftentimes estimated. For example, energy consumption information about a hot water heater would likely be estimated based on type and size rather accurately assessed based on make and model.

Presently, energy audits are typically done on a standalone system using spreadsheets, and then the information is transcribed into auditing software, which runs analytics to provide recommendations. This process is manual, intrusive, complicated and time consuming.

SUMMARY

A system and method includes obtaining an address of a structure, obtaining picture of objects in the structure with a networked mobile device, deriving identification information from the pictures, using the identification information to obtain energy usage information from databases, and generating an energy audit based on the objects and energy usage information.

A system includes a networked mobile device with a processor, camera, and memory. An application stored on the memory of the device and having code stored to cause the processor to derive identification information from images of objects in a structure, use the identification information to obtain energy usage information from databases, and obtain an energy audit based on the objects and energy usage information.

A mobile device having a processor, a display, a memory, and a network connection, the mobile device including an application stored on the mobile device memory to cause the mobile device to display an energy audit interface, the energy audit interface containing screens to direct a user to obtain images of energy related objects in a structure, identify the energy related objects via image analytics, obtain energy related information about identified energy related objects, and display the information about the energy related objects including recommendations regarding the energy related objects to conserve energy.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In one embodiment, a mobile energy audit application makes an energy auditing process seamless and intuitive, even for an inexperienced homeowner. The energy audit application may be installed on a camera-enabled mobile device, such as an Apple iPod™/iPad™ or an Android™ phone/tablet. The output of the application may be viewed on the mobile device or through an Internet browser.

Figure 1:
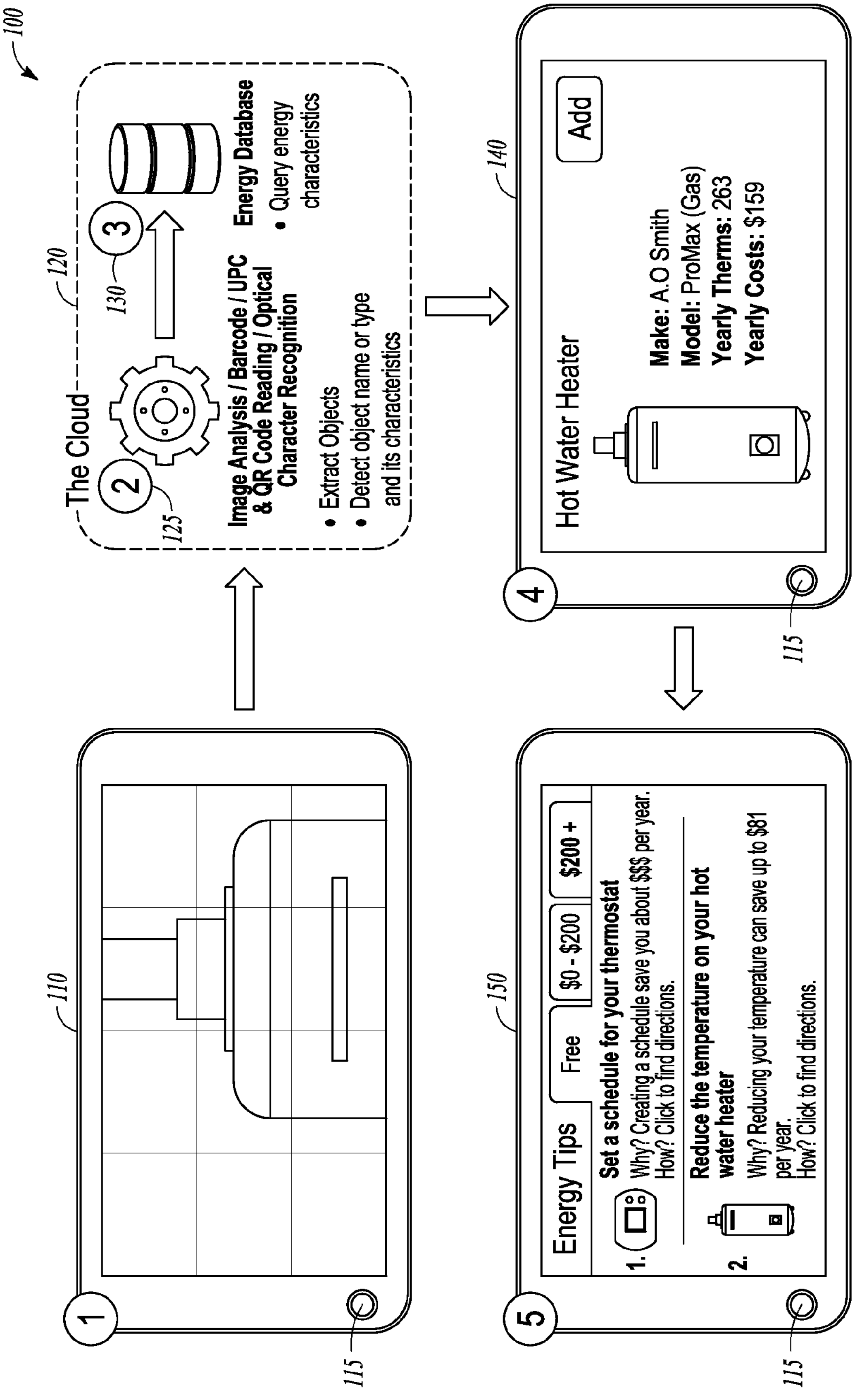
FIG. 1 is a block schematic diagram of a system to provide energy audits according to an example embodiment.

FIG. 1 is a block schematic diagram of a system 100 for providing an energy audit according to example embodiments. In one embodiment, an application is downloaded and installed on a camera-enabled mobile device 110. A camera is illustrated at 115 for capturing images. An intuitive user interface assists a homeowner or occupant to collect home energy data using automated features. For example, the user collects data by capturing a photo/image of an energy consuming object in the home using the camera of the mobile device. An image of a water heater is illustrated on the mobile device 110 in this example. The image may be analyzed on the device 110 itself or sent to a cloud-based or server based image analysis service 120. An image analysis service 125 extracts relevant information about the object utilizing off the shelf image analytics. The information may be extracted from the image of the appliance itself, or may be extracted from for example reading barcodes, universal product codes (UPC), quick response (QR) codes, and optical character recognition (OCR). In some embodiments, the object may include structural elements of the home, such as windows and doors.

The application queries one or several databases at 130 and extracts energy characteristics, manuals, and specifications based on information provided by the image analysis. The mobile device may then display and store each audited object/structure and its energy characteristics/manuals/specifications at 140 in a home energy profile. Within the profile, users can make changes to the objects/structures, receive tips about how to reduce energy consumption, see their energy consumption, and browse a list of alternatives and recommended vendors of those products via the mobile device interface. A screen at 150 illustrates one tab for energy tips that are free to a user. This particular list of tips includes setting a schedule for a thermostat and reducing the temperature of a water heater to conserve energy. Three tabs are shown in this example screen interface, with a free tips tab selected. Other tabs for example show ranges of prices for implementing tips from $0 to $200, and $200 plus. Such tabs would likely include costs of replacing inefficient appliances with more efficient model appliances.

Figure 2:
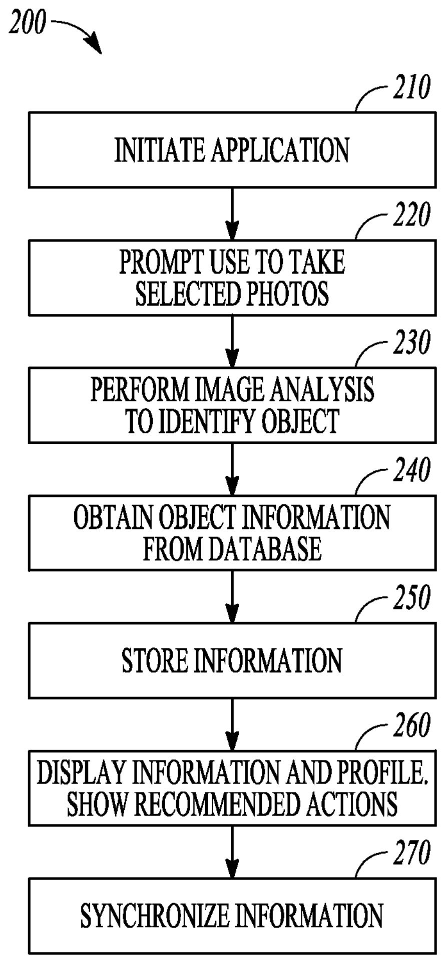
FIG. 2 is a flowchart illustrating a computer implemented method of performing an energy audit according to an example embodiment.

Input of objects such as appliances, HVAC (heating ventilation and air conditioning) devices, hot water heater, lighting, and others, such as structures within the home (e.g., windows, doors, etc.) may be performed in multiple ways. A method of performing an energy audit for a structure is illustrated at 200 in FIG. 2. At 210, the user initiates an application running on the mobile device. The application first obtains an address of a structure, such as the address of the user's home. The address can be determined by GPS or other phone locating mechanisms such as triangulation or may be input by the user. Using the address, the application may query external databases to determine the overall characteristics of the home (e.g., square footage, number of rooms, year built, etc.).

In one embodiment, the user is instructed, step-by-step at 220, what information should be provided for the energy audit (based on the home characteristics). Example instructions might include a list of appliances normally associated with the type of structure. For instance, a structure with a kitchen may result in prompts for the user to photograph a refrigerator, a stove, a dishwasher and other common appliances, such as toaster oven, microwave, etc. A structure located in a climate with both cold winters and hot summers will prompt the user to take pictures of both a heating appliance such as a furnace or boiler and a cooling appliance such as one or more air conditioners. The prompts may be ordered such that the user travels through the structure in an orderly fashion to obtain all the photographs desired.

Information input is automated by collecting data visually through the camera-enabled mobile device. As indicated above, the user is instructed to use the camera feature of the mobile device to take a photo of the object characteristics. The photo may be of one or more of QR or bar codes of the object, the object itself, or text on the object indicating make/model/serial number. The photo may also include the space that contains the object/structure.

Image analysis of the object/structure characteristics may be performed in some embodiments as indicated at 230. Image analysis can take place on the device itself or using a cloud-based service. Image analysis extracts identifying characteristics within the image taken by the mobile device.

Examples of image analysis include interpretation of bar codes, QR codes, a comparative image search based on object characteristics, identifying and converting text within the image to searchable text within the application, identifying room parameters (wall height, width, depth) including the recognition of windows and the size of windows.

Luminosity information with respect to ambient illumination may be used to identify quantity and location of light fixtures in the home. Images, as well as information obtained via querying databases based on an address of a structure can also be used to construct and update a Building Information model of the home.

The result of image analysis is information that may include the make and model of the specific object/structure within the image. The system, either the application on the mobile device or the server may automatically connect to one or several external databases at 240 to retrieve accurate information (e.g., AHRI, Energystar). From these databases, the system, either via the application or the server queries and extracts information related to the object/structure's specific energy information, manuals, specifications, etc.

The system stores the information at 250 and causes the mobile device to display information at 260 about the user's home energy profile in two specific ways. First, users can view information about the audited objects/characteristics of their home (e.g., energy ratings, specifications, manuals). Second, users can view an overall, consolidated energy profile of their home. Here, the user is able to make changes to the information, view user tips provided by the application, and see a list of recommended object/structure replacements and vendors. The stored information may be automatically synchronized at 270 with a remote data storage that can be hosted on the internet and accessed via other user devices such as lap top or desk top computers, or via the mobile device.

Figure 3:
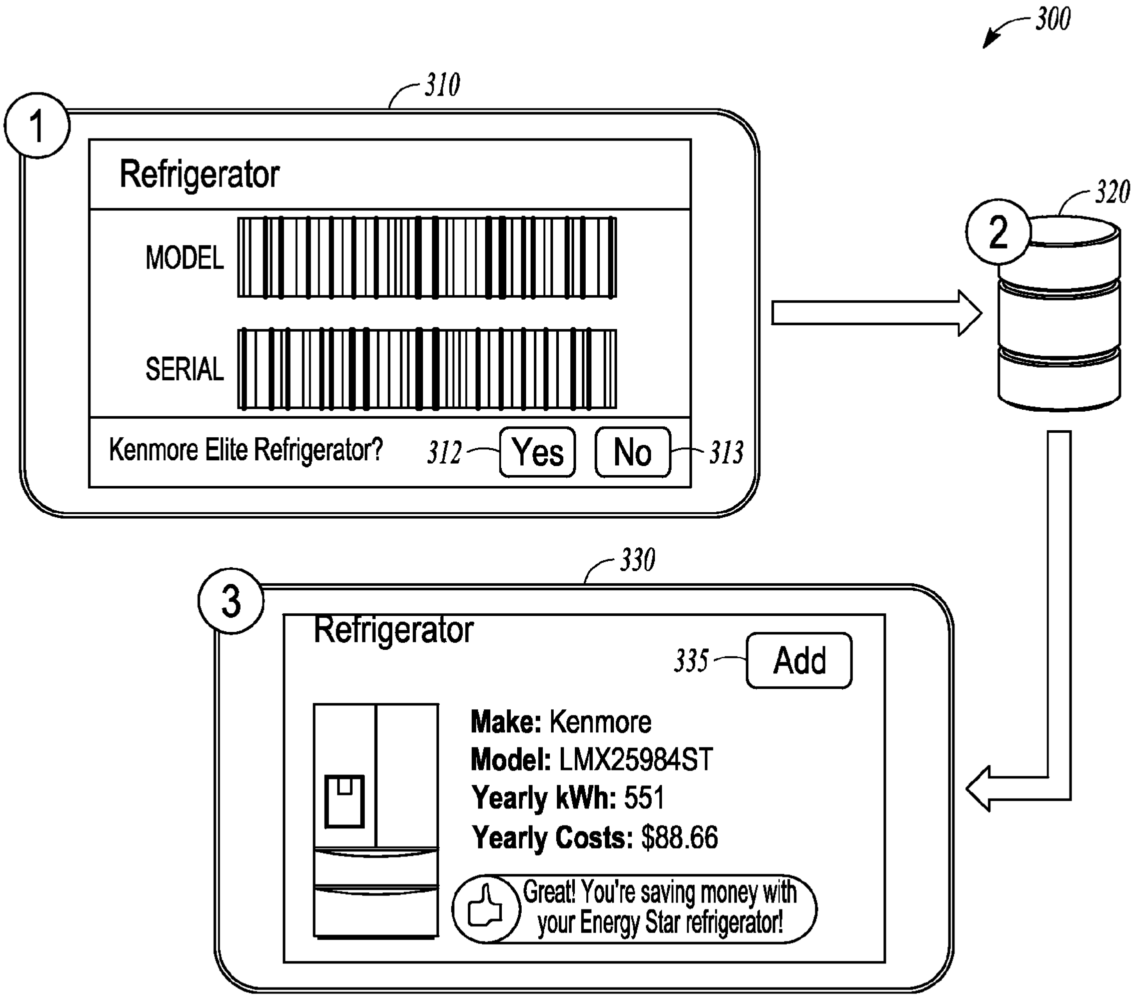
FIG. 3 is a block schematic flow diagram illustrating a method of capturing a bar code image and performing image analytics according to an example embodiment.

FIG. 3 is a block schematic flow diagram illustrating a method 300 of capturing a bar code image. The bar code image is shown at 310 on a mobile device display with a question regarding the make and model of a refrigerator with "yes" and "no" buttons 312, 313 for the user to select to confirm the make and model.

At 320, the make and model is used to query an energy database. At 330 information from the energy database and from the image analysis is displayed on the mobile device. The user is provided an "add" button 335 to add the refrigerator to the audit information.

Figure 4:
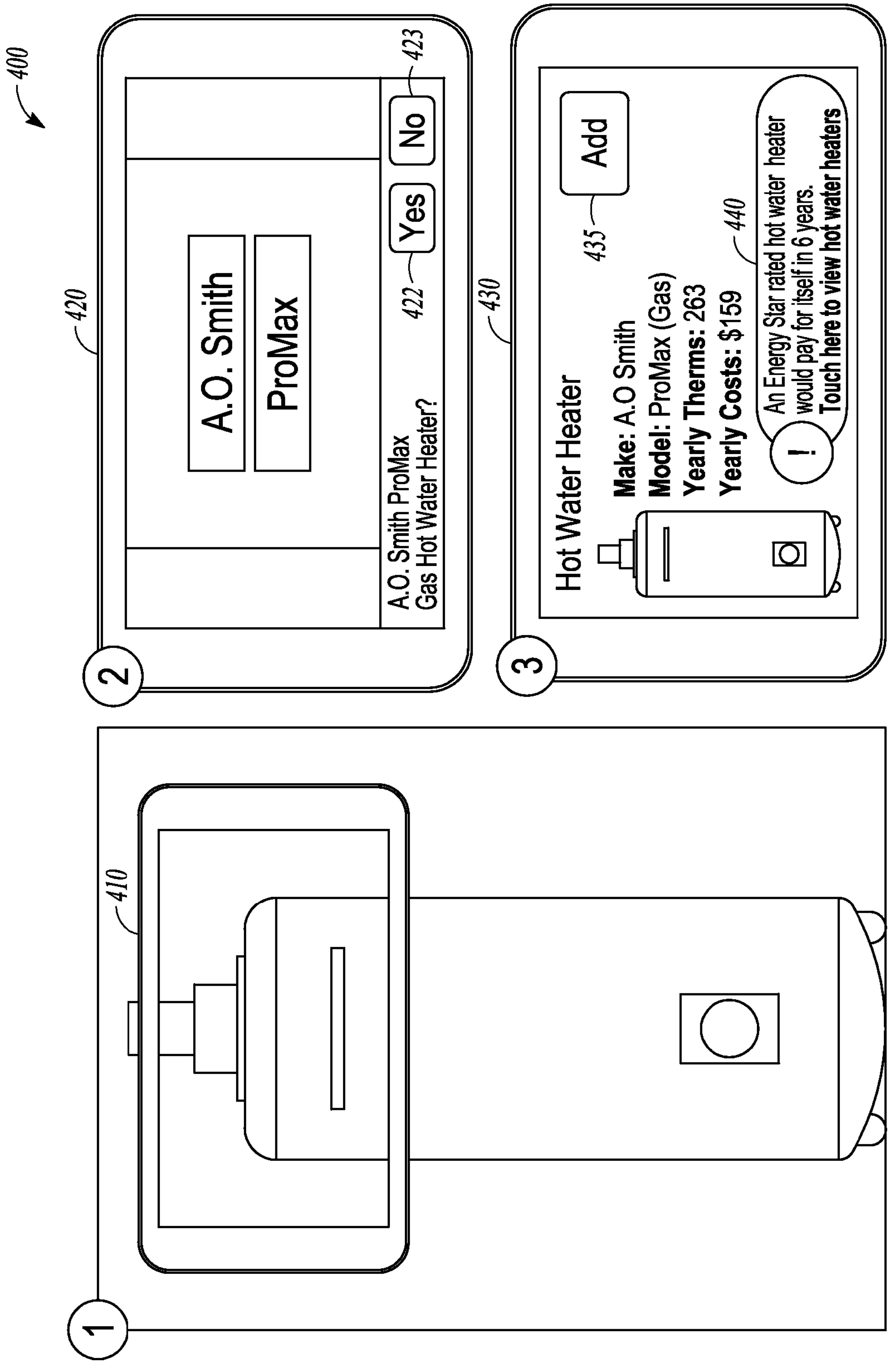
FIG. 4 is a block schematic flow diagram illustrating a method of capturing an image of an appliance and performing image analytics according to an example embodiment.

FIG. 4 is a block schematic flow diagram illustrating a method 400 of capturing an image of an appliance. The appliance image taken by the user is shown at 410 on a mobile device display. Image analysis is performed, and results in the recognition in the image of a text based tag indicating the make and model of a water heater as illustrated at 420. The recognized text is illustrated with a question regarding the make and model of a water heater with "yes" and "no" buttons 422, 423 for the user to select to confirm the make and model.

At 430, the make and model is used to query an energy database and information from the energy database and from the image analysis is displayed on the mobile device. The user is provided an "add" button 435 to add the water heater to the audit information. At 440, information about a more efficient appliance is provided with a link to view water heaters that may pay for themselves in six years. This information will vary from appliance to appliance. Further information that may be provided includes recommended maintenance information, recalls, rebates or coupons for newer more efficient replacement appliances, and even information regarding recommended repair personnel and technical assistance resources. Other types of information related to the appliances may also be provided, such as deals from utility companies for placing air conditioning equipment on reduced duty cycle during peak energy consumption periods may be provided.

Figure 5:
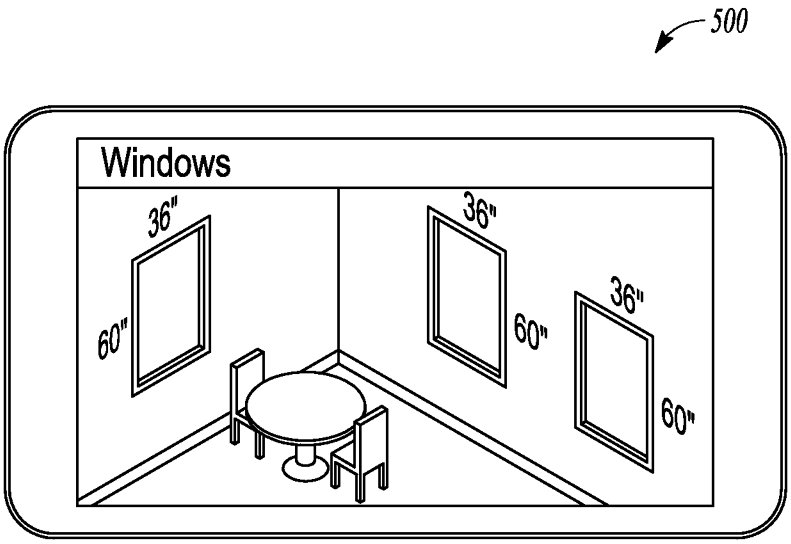
FIG. 5 is a mobile device displaying an image of a room on which image analytics are performed according to an example embodiment.

FIG. 5 is a mobile device 500 showing an image of a room taken by a user. Windows in the room are identified and sizes are identified by image analysis. In some embodiments, the known dimensions of the room at the address obtained may be used to aid in defining the size of the windows. The user may be prompted about type of panes and air gaps in the windows.

Figure 6:
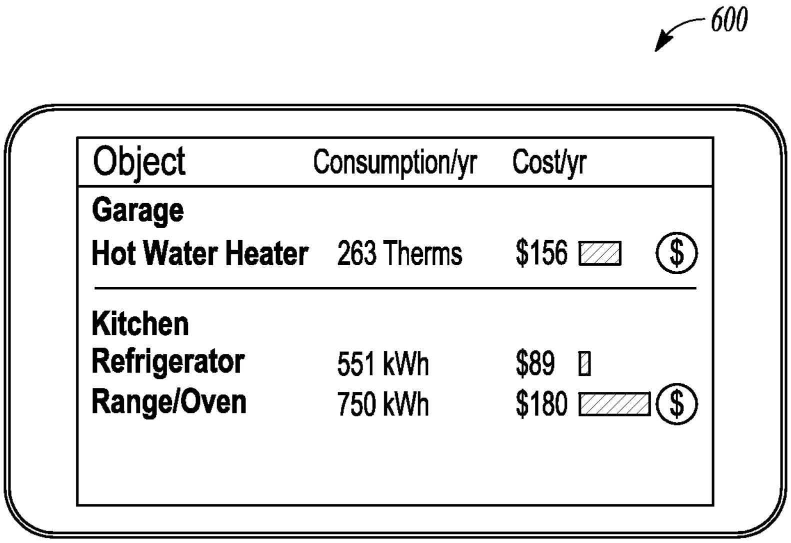
FIG. 6 is a mobile device displaying information derived from photographs of objects in a structure according to an example embodiment.

FIG. 6 is a mobile device 600 showing a display with data stored for use in the structure energy profile. As shown, a room, such as a garage contains a water heater that consumes 263 therms per year at a cost of $156. A kitchen contains a refrigerator that consumes 551 kilowatt hours at a cost of $89 per year and a range/oven that consumes 750 kilowatt hours at a cost of $180 per year.

Figure 7:
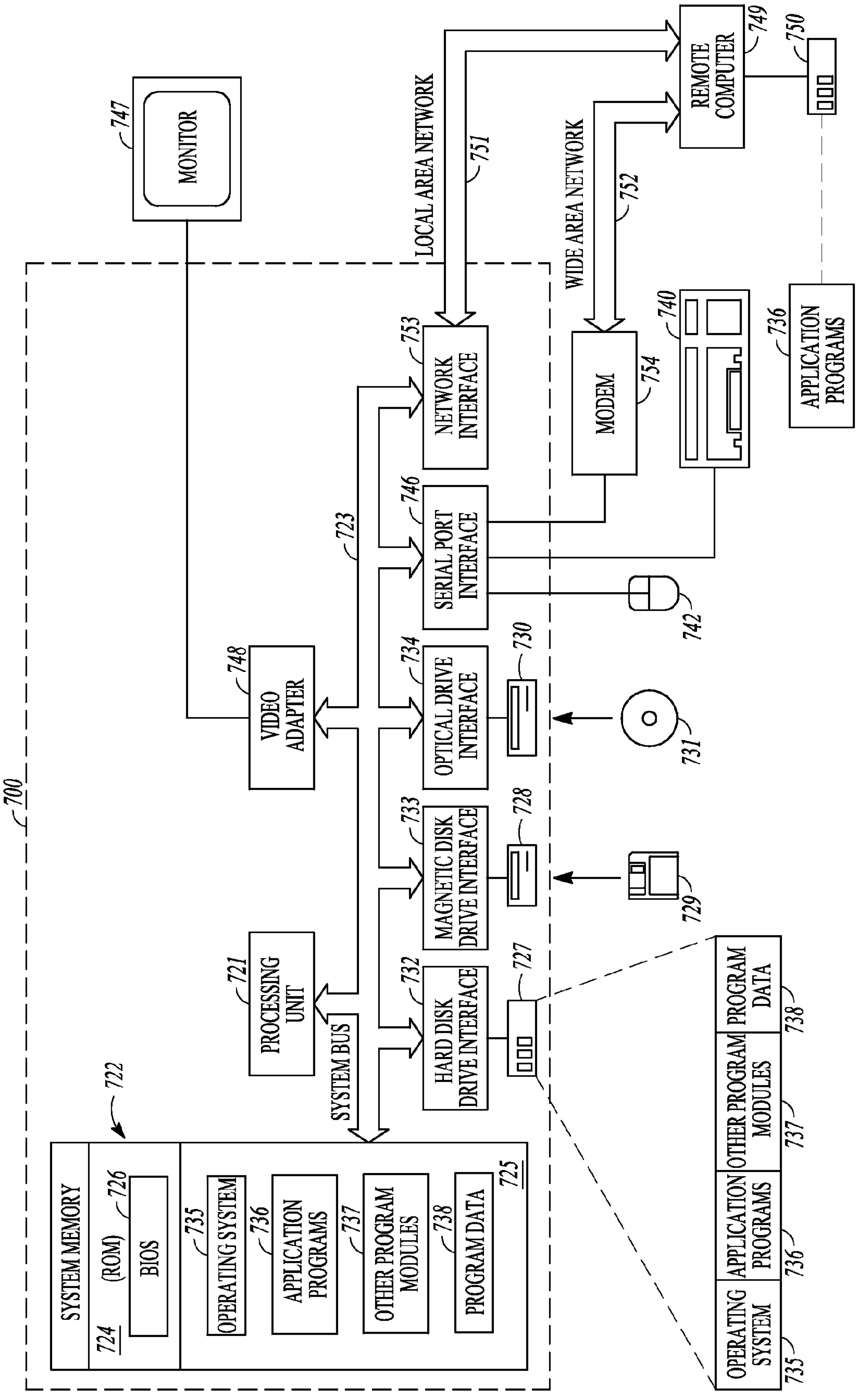
FIG. 7 is an example computer system to be programmed to execute methods according to example embodiments.

FIG. 7 is a block diagram of a computer system 700 to implement methods according to an example embodiment. In the embodiment shown in FIG. 7, a hardware and operating environment is provided that is applicable to any of the servers and/or mobile devices shown in the other Figures. In mobile devices, many of the elements shown are not needed.

As shown in FIG. 7, one embodiment of the hardware and operating environment includes a general purpose computing device in the form of a computer (e.g., a personal computer, workstation, or server), including one or more processing units 721, a system memory 722, and a system bus 723 that operatively couples various system components including the system memory 722 to the processing unit 721. There may be only one or there may be more than one processing unit 721, such that the processor of computer comprises a single central-processing unit (CPU), or a plurality of processing units, commonly referred to as a multiprocessor or parallel-processor environment. In various embodiments, computer is a conventional computer, a distributed computer, or any other type of computer.

The system bus 723 can be any of several types of bus structures including a memory bus or memory controller, a peripheral bus, and a local bus using any of a variety of bus architectures. The system memory can also be referred to as simply the memory, and, in some embodiments, includes read-only memory (ROM) 724 and random-access memory (RAM) 725. A basic input/output system (BIOS) program 726, containing the basic routines that help to transfer information between elements within the computer, such as during start-up, may be stored in ROM 724. The computer further includes a hard disk drive 727 for reading from and writing to a hard disk, not shown, a magnetic disk drive 728 for reading from or writing to a removable magnetic disk 729, and an optical disk drive 730 for reading from or writing to a removable optical disk 731 such as a CD ROM or other optical media.

The hard disk drive 727, magnetic disk drive 728, and optical disk drive 730 couple with a hard disk drive interface 732, a magnetic disk drive interface 733, and an optical disk drive interface 734, respectively. The drives and their associated computer-readable media provide non volatile storage of computer-readable instructions, data structures, program modules and other data for the computer. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 729, optical disk 731, ROM 724, or RAM 725, including an operating system 735, one or more application programs 736, other program modules 737, and program data 738. Programming for implementing one or more processes or method described herein may be resident on any one or number of these computer-readable media.

A user may enter commands and information into computer through input devices such as a keyboard 740 and pointing device 742. Other input devices (not shown) can include a microphone, joystick, game pad, satellite dish, scanner, or the like. These other input devices are often connected to the processing unit 721 through a serial port interface 746 that is coupled to the system bus 723, but can be connected by other interfaces, such as a parallel port, game port, or a universal serial bus (USB). A monitor 747 or other type of display device, such as a touchscreen in the case of a mobile device, can also be connected to the system bus 723 via an interface, such as a video adapter 748. The monitor 747 can display a graphical user interface for the user. In addition to the monitor 747, computers typically include other peripheral output devices (not shown), such as speakers and printers.

The computer may operate in a networked environment using logical connections to one or more remote computers or servers, such as remote computer 749. These logical connections are achieved by a communication device coupled to or a part of the computer; the invention is not limited to a particular type of communications device. The remote computer 749 can be another computer, a server, a router, a network PC, a client, a peer device or other common network node, and typically includes many or all of the elements described above I/O relative to the computer, although only a memory storage device 750 has been illustrated. The logical connections depicted in FIG. 7 may include a local area network (LAN) 751 and/or a wide area network (WAN) 752. Such networking environments are commonplace in office networks, enterprise-wide computer networks, intranets and the internet, which are all types of networks.

When used in a LAN-networking environment, the computer is connected to the LAN 751 through a network interface or adapter 753, which is one type of communications device. In some embodiments, when used in a WAN-networking environment, the computer typically includes a modem 754 (another type of communications device) or any other type of communications device, e.g., a wireless transceiver, for establishing communications over the wide-area network 752, such as the internet. The modem 754, which may be internal or external, is connected to the system bus 723 via the serial port interface 746. In a networked environment, program modules depicted relative to the computer can be stored in the remote memory storage device 750 of remote computer, or server 749. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

EXAMPLES

Example 1

A method comprising:

obtaining an address of a structure;

obtaining images of objects in the structure with a networked mobile device;

deriving identification information from the images via image analytic software executing on a computer;

using the identification information to obtain energy usage information from databases via the computer; and generating an energy audit via the computer based on the objects and energy usage information.

Example 2

The method of example 1 wherein the information derived from the images includes a bar code or QR code.

Example 3

The method of any of examples 1-2 wherein the information derived from the images includes textual information printed on the object from which identifies the object.

Example 4

The method of any of examples 1-3 wherein the objects include devices in a structure that utilize energy.

Example 5

The method of any of examples 1-4 wherein an object includes a room in the structure, and wherein the method includes:

processing an image to identify windows and sizes of the windows in the room.

Example 6

The method of any of examples 1-5 and further including using luminosity information to identify light fixtures in the room.

Example 7

The method of any of examples 1-6 wherein the address is obtained via GPS capabilities in a networked mobile device that performs the method.

Example 8

The method of any of examples 1-6 and further comprising providing prompts for a user of a mobile device to take pictures of selected objects in the structure.

Example 9

The method of any of examples 1-6 wherein the computer comprises a mobile device.

Example 10

The method of any of examples 1-6 wherein the computer comprises cloud based computing resources.

Example 11

A system comprising:

a networked mobile device with a processor, camera, and memory;

an application stored on the memory of the device and having code stored to cause the processor to:

derive identification information from images of objects in a structure;

use the identification information to obtain energy usage information from databases; and obtain an energy audit based on the objects and energy usage information.

Example 12

The system of example 11 wherein the energy audit is performed by the processor.

Example 13

The system of any of examples 11-12 wherein the energy audit is performed by a computer coupled to the mobile device via a network.

Example 14

The system of any of examples 11-13 wherein identification information is derived by the processor.

Example 15

The system of any of examples 11-14 wherein the identification information is derived by a computer coupled to the mobile device via a network.

Example 16

The system of any of examples 11-15 wherein the application further causes the process to prompt a user of the mobile device to obtain images of selected objects.

Example 17

The system of any of examples 11-16 wherein the application causes the mobile device to display a structure profile including information about appliances and recommendations for replacing appliances to conserve energy.

Example 18

A mobile device having a processor, a display, a memory, and a network connection, the mobile device comprising:

an application stored on the mobile device memory to cause the mobile device to display an energy audit interface, the energy audit interface containing screens to:

direct a user to obtain images of energy related objects in a structure;

identify the energy related objects via image analytics;

obtain energy related information about identified energy related objects; and display the information about the energy related objects including recommendations regarding the energy related objects to conserve energy.

Example 19

The mobile device of example 18 wherein the application causes the mobile device to utilize a networked computer to perform the image analytics.

Example 20

The mobile device of any of examples 18-19 wherein the energy related information is obtained from a networked database of energy information.

Example 21

The mobile device of any of examples 18-20 wherein the energy related information is compiled in an energy profile of the structure and is stored on the mobile device and synchronized with storage on a remote server.

Example 22

The mobile device of any of examples 18-21 wherein the images contain codes attached to the objects from which the objects are identifiable.

Example 23

The mobile device of any of examples 18-22 wherein the application further causes the mobile device to obtain an address of the structure and wherein the selected objects the user is directed to obtain images of are selected as a function of the address of the structure.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:

obtaining an address of a structure;

obtaining images of rooms in the structure with a networked mobile device;

processing the images of the rooms to identify windows and sizes of the windows in the rooms;

identifying quantities and locations of light fixtures in the rooms using luminosity information;

deriving identification information from the images via image analytic software executing on a computer;

using the identification information to obtain energy specification information from databases via the computer;

generating an energy audit via the computer based on the rooms, windows, light fixtures, and energy specification information; and displaying the energy audit on the networked mobile device.

2. The method of claim 1 wherein the information derived from the images includes a bar code or QR code.

3. The method of claim 1 wherein the information derived from the images includes textual information printed on the rooms, windows, or light fixtures which identifies the rooms, windows, or light fixtures.

4. The method of claim 1 wherein the address is obtained via GPS capabilities in a networked mobile device that performs the method.

5. The method of claim 1 and further comprising providing prompts for a user of a mobile device to take pictures of selected objects in the structure.

6. The method of claim 1 wherein the computer comprises a mobile device.

7. The method of claim 1 wherein the computer comprises cloud based computing resources.

8. A system comprising:

a networked mobile device with a processor, camera, and memory;

an application stored on the memory of the device and having code stored to cause the processor to:

derive identification information from images of rooms in a structure;

process the images of the rooms to identify windows and sizes of the windows in the rooms;

identify quantities and locations of light fixtures in the rooms using luminosity information;

use the identification information to obtain energy specification information from databases;

obtain an energy audit based on the rooms, windows, light fixtures, and energy specification information; and display the energy audit on the networked mobile device.

9. The system of claim 8 wherein the energy audit is performed by a computer coupled to the mobile device via a network and wherein the identification information is derived by a computer coupled to the mobile device via a network.

10. The system of claim 8 wherein the application further causes the process to prompt a user of the mobile device to obtain images of selected objects.

11. The system of claim 8 wherein the application causes the mobile device to display a structure profile including information about appliances and recommendations for replacing appliances to conserve energy.

12. A mobile device having a processor, a display, a memory, and a network connection, the mobile device comprising:

an application stored on the mobile device memory to cause the mobile device to display an energy audit interface, the energy audit interface containing screens to:

direct a user to obtain images of rooms in a structure;

process the images of the rooms using image analytics to identify windows and sizes of the windows in the rooms;

identify quantities and locations of light fixtures in the rooms using luminosity information;

obtain energy specification information about the rooms, windows, and light fixtures; and display the energy specification information about the rooms, windows, light fixtures including recommendations regarding the rooms, windows, light fixtures to conserve energy.

13. The mobile device of claim 12 wherein the application causes the mobile device to utilize a networked computer to perform the image analytics.

14. The mobile device of claim 12 wherein the energy specification information is obtained from a networked database of energy specification information.

15. The mobile device of claim 14 wherein the energy specification information is compiled in an energy profile of the structure and is stored on the mobile device and synchronized with storage on a remote server.

16. The mobile device of claim 12 wherein the images contain codes attached to the rooms, windows, and light fixtures from which the rooms, windows, and light fixtures are identifiable.

17. The mobile device of claim 12 wherein the application further causes the mobile device to obtain an address of the structure and wherein the selected rooms the user is directed to obtain images of are selected as a function of the address of the structure.

* * * * *